(12) United States Patent
Tesoroni

(10) Patent No.: US 10,625,411 B2
(45) Date of Patent: Apr. 21, 2020

(54) APPARATUS, SYSTEM AND METHOD OF RETAINING HAND TOOLS

(71) Applicant: Lance Robert Tesoroni, Saylorsburg, PA (US)

(72) Inventor: Lance Robert Tesoroni, Saylorsburg, PA (US)

(*) Notice: Subject to any disclaimer, the term of this patent is extended or adjusted under 35 U.S.C. 154(b) by 29 days.

(21) Appl. No.: 15/968,912

(22) Filed: May 2, 2018

(65) Prior Publication Data

US 2018/0326573 A1 Nov. 15, 2018

Related U.S. Application Data

(60) Provisional application No. 62/504,361, filed on May 10, 2017.

(51) Int. Cl.
| | |
|---|---|
| *A47G 1/17* | (2006.01) |
| *B25H 3/04* | (2006.01) |
| *F16B 2/22* | (2006.01) |
| *F16B 1/00* | (2006.01) |
| *B25H 5/00* | (2006.01) |
| *F16B 2/10* | (2006.01) |

(52) U.S. Cl.
CPC .............. *B25H 3/04* (2013.01); *F16B 1/00* (2013.01); *F16B 2/22* (2013.01); *B25H 5/00* (2013.01); *F16B 2/10* (2013.01); *F16B 2001/0035* (2013.01)

(58) Field of Classification Search
CPC .... F16B 2001/0035; F16B 47/00; F16B 2/22; B25H 3/04

USPC .................................. 248/206.5, 683, 309.4
See application file for complete search history.

(56) References Cited

U.S. PATENT DOCUMENTS

| | | | |
|---|---|---|---|
| 3,291,429 A | 12/1966 | Neanhouse | |
| 4,907,769 A | 3/1990 | Hunley, Jr. | |
| 4,985,817 A * | 1/1991 | Yale | F21L 14/02 248/206.5 |
| 5,165,629 A | 11/1992 | Breveglieri | |
| 6,561,206 B1 * | 5/2003 | Wilkinson | A61H 3/0244 135/65 |
| 6,932,223 B1 | 8/2005 | Lee | |
| 7,699,277 B2 * | 4/2010 | Bagnall | A01K 63/006 119/230 |
| 8,403,278 B1 * | 3/2013 | Kasbohm | F41C 33/06 211/64 |
| 8,695,935 B1 * | 4/2014 | Kasbohm | F41C 33/06 211/64 |
| 2008/0035590 A1 | 2/2008 | Huang | |
| 2016/0016306 A1 | 1/2016 | Haddon | |

* cited by examiner

*Primary Examiner* — Todd M Epps
(74) *Attorney, Agent, or Firm* — Zale Patent Law, Inc.; Lawrence P. Zale

(57) ABSTRACT

A magnetic tool holder having: a tool retainer clip, wherein the tool retainer clip includes a base, a first side and a second side operatively connected to the base, a pair of clip flanges extending generally perpendicular from the first side, and a magnet located within a portion of the second side; and a clip insert, wherein the clip insert includes a clip insert frame, a pair of alignment extensions located on the clip insert frame, a pair of retention protrusions located on the clip insert frame and located adjacent to the pair of alignment extensions, and a pair of clip insert flanges operatively connected to the clip insert frame and located adjacent to the pair of alignment extensions.

20 Claims, 9 Drawing Sheets

APPARATUS, SYSTEM AND METHOD OF RETAINING HAND TOOLS

CROSS-REFERENCE TO A RELATED APPLICATION

This application claims the benefit of U.S. provisional application No. 62/504,361 filed on May 10, 2017, entitled "A Magnetic Tool Holding Device With Inter-changeable Inserts", by the same inventor as this application, Lance R. Tesoroni, the contents of which are herein incorporated by reference to the extent that they do not contradict the current application.

FIELD OF THE INVENTION

The present invention relates generally to storage and, more particularly, to an improved magnetic tool holding system embodying an improved method and apparatus for adjustably retaining hand tools or the like in any position on a ferromagnetic surface, whether that surface is disposed on the exterior of heavy equipment, around a job site, in a truck bed, in a truck cab, in a car trunk, in a garage, in or on a utility closet or the like. The improved method and apparatus for adjustably retaining hand tools or the like allows hand tools or the like having different sized handles to be securely retained by the magnetic tool holding system. In particular, the improved magnetic tool holding system allows for the adaption of the magnetic tool holding system by utilizing an insert for securely retaining hand tools having different handle sizes.

BACKGROUND OF THE INVENTION

Prior to the present invention, as set forth in general terms above and more specifically below, it is known that there are no easy, adjustable ways to transport or organize hand tools and implements having elongated, round handles, such as shovels, rakes, and the like. Such hand tools usually are stacked in a disorganized jumble in closets, garages, pickup beds, or on the ground, are difficult to retrieve, and are often damaged or lost. Moreover, such hand tools tend to slide around in the back of a truck or trunk of a car unless one installs a bulky, permanent and often damaging retaining device. In addition, transporting such hand tools inside heavy equipment is dangerous and difficult, yet there are no hand tool retaining devices operable for the exterior or interior of heavy equipment.

Furthermore, current retaining devices for hauling, storing and organizing hand tools are attached with screws, tape, straps, or glue, and, therefore, are not adjustable and cannot be removed easily. Additionally, by being fixed in place, these current retaining devices take up precious cargo space and cannot be adjusted to suit the tool, job site and/or cargo hauling needs.

Finally, it is known to employ various types of tool holding systems. See for example, U.S. Pat. No. 3,291,429 to Neanhouse, U.S. Pat. No. 5,165,629 to Breveglieri, U.S. Pat. No. 6,932,223 to Lee et al., U.S. Pat. No. 8,403,278 to Kasbohm, and U.S. Patent Application No. 2016/0016306 to Haddon et al.

Consequently, while these various tool holding systems may have been generally satisfactory, there is nevertheless a need for a new and improved method and apparatus for adjustably retaining hand tools or the like which allows hand tools or the like of different sizes to be securely retained by the magnetic tool holding system, wherein the improved magnetic tool holding system allows for the adaption of the magnetic tool holding system by utilizing an insert for securely retaining different handle sizes. Furthermore, there is a need for an improved magnetic tool holding system embodying a method and apparatus for adjustably retaining hand tools in any position on a ferromagnetic surface, whether that surface is disposed on the exterior of heavy equipment, around a job site, in a truck bed, in a truck cab, in a car trunk, in a garage, in or on a utility closet or the like.

It is a purpose of this invention to fulfill these and other needs in the tool holding art in a manner more apparent to the skilled artisan once given the following disclosure.

BRIEF SUMMARY OF THE INVENTION

A first aspect of the present invention is a magnetic tool holder, including a tool retainer clip, wherein the tool retainer clip includes a base, a first side and a second side operatively connected to the base, a pair of clip flanges extending generally perpendicular from the first side, and a magnet located within a portion of the second side; and a clip insert, wherein the clip insert includes a clip insert frame, a pair of alignment extensions located on the clip insert frame, a pair of retention protrusions located on the clip insert frame and located adjacent to the pair of alignment extensions, and a pair of clip insert flanges operatively connected to the clip insert frame and located adjacent to the pair of alignment extensions.

In one embodiment of the first aspect of the present invention, the tool retainer clip further includes a tool retainer clip extension operatively connected to the first side and located between the pair of clip flanges.

In another embodiment of the first aspect of the present invention, the clip insert further includes first and second alignment protrusions operatively connected to the clip insert frame such that the first alignment protrusion is located along a portion of one of the pair of clip insert flanges and the second alignment protrusion is located along a portion of the other of the pair of clip insert flanges.

In another embodiment of the first aspect of the present invention, the clip insert further includes a third alignment protrusion operatively connected to the clip insert frame, wherein the third alignment protrusion is located between the pair of retention protrusions.

In another embodiment of the first aspect of the present invention, the base further includes a magnet cavity located within a portion of the second side such that the magnet cavity is adapted and dimensioned to removably receive the magnet.

In still another embodiment of the first aspect of the present invention, the base further includes a fastener hole located within the magnet cavity.

In an even further embodiment of the first aspect of the present invention, the base further includes a peripheral sidewall interconnecting the second side and the first side, wherein a first plurality of projections is located along a first portion of the peripheral sidewall and wherein a second plurality of projections is located on an opposing second portion of the peripheral sidewall.

In yet another embodiment of the first aspect of the present invention, the base further includes a first female notch and a first male bump located on the first plurality of projections, and a second female notch and a second male bump located on the second plurality of projections.

In still another embodiment of the first aspect of the present invention, the magnetic tool holder further includes a receptive pocket located adjacent to the pair of clip flanges and the pair of clip insert flanges.

A second aspect of the present invention is a magnetic tool holder, including a tool retainer clip, wherein the tool retainer clip includes a base, a first side and a second side operatively connected to the base, a pair of clip flanges extending generally perpendicular from the first side, and a magnet located within a portion of the second side; a magnet cavity located within a portion of the second side such that the magnet cavity is adapted and dimensioned to removably receive the magnet; and a clip insert, wherein the clip insert includes a clip insert frame, a pair of alignment extensions located on the clip insert frame, a pair of rounded retention snap-on clips located on the clip insert frame and located adjacent to the pair of alignment extensions, and a pair of clip insert flanges operatively connected to the clip insert frame and located adjacent to the pair of alignment extensions.

In one embodiment of the second aspect of the present invention, the tool retainer clip further includes a tool retainer clip extension operatively connected to the first side and located between the pair of clip flanges, wherein a widened area is located along a portion of the tool retainer clip extension.

In another embodiment of the second aspect of the present invention, the clip insert further includes first and second alignment protrusions operatively connected to the clip insert frame such that the first alignment protrusion is located along a portion of one of the pair of clip insert flanges and the second alignment protrusion is located along a portion of the other of the pair of clip insert flanges.

In another embodiment of the second aspect of the present invention, the clip insert further includes a third alignment protrusion operatively connected to the clip insert frame, wherein the third alignment protrusion is located between the pair of rounded retention snap-on clips.

In still another embodiment of the second aspect of the present invention, the base further includes a fastener hole located within the magnet cavity.

In an even further embodiment of the second aspect of the present invention, the base further includes a peripheral sidewall interconnecting the second side and the first side, wherein a first plurality of projections is located along a first portion of the peripheral sidewall and wherein a second plurality of projections is located on an opposing second portion of the peripheral sidewall.

In yet another embodiment of the second aspect of the present invention, the base further includes a first female notch and a first male bump located on the first plurality of projections, and a second female notch and a second male bump located on the second plurality of projections.

In still another embodiment of the second aspect of the present invention, the magnetic tool holder further includes a receptive pocket located adjacent to the pair of clip flanges and the pair of clip insert flanges.

A third aspect of the present invention is a method of retaining tools, wherein the method includes the steps of: providing a magnetic tool holder comprising: a tool retainer clip, wherein the tool retainer clip includes a base, a first side and a second side operatively connected to the base, a pair of clip flanges extending generally perpendicular from the first side, and a magnet located within a portion of the second side; and a clip insert, wherein the clip insert includes a clip insert frame, a pair of alignment extensions located on the clip insert frame, a pair of retention protrusions located on the clip insert frame and located adjacent to the pair of alignment extensions, and a pair of clip insert flanges operatively connected to the clip insert frame and located adjacent to the pair of alignment extensions; forming a receptive pocket, wherein the receptive pocket is located adjacent to the pair of clip flanges and the pair of clip insert flanges; inserting a portion of a tool handle into the receptive pocket; securely retaining the tool handle by the magnetic tool holder; and magnetically attaching the magnetic tool handle to a ferromagnetic surface to removably retain the tool handle to the ferromagnetic surface.

In one embodiment of the third aspect of the present invention, the step of providing a magnetic tool holder further includes the step of providing the clip insert with first and second alignment protrusions operatively connected to the clip insert frame such that the first alignment protrusion is located along a portion of one of the pair of clip insert flanges and the second alignment protrusion is located along a portion of the other of the pair of clip insert flanges.

In another embodiment of the third aspect of the present invention, the step of providing a magnetic tool holder further includes the step of providing the clip insert with a third alignment protrusion operatively connected to the clip insert frame and wherein the third alignment protrusion is located between the pair of retention protrusions.

The preferred improved magnetic tool holding system, according to various embodiments of the present invention, offers the following advantages: ease of use; lightness in weight; durability; excellent tool retaining characteristics; and the ability to retain tools having different handle sizes. In fact, in many of the preferred embodiments, these advantages are optimized to an extent that is considerably higher than heretofore achieved in prior, known tool holding systems.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

Figure 5:
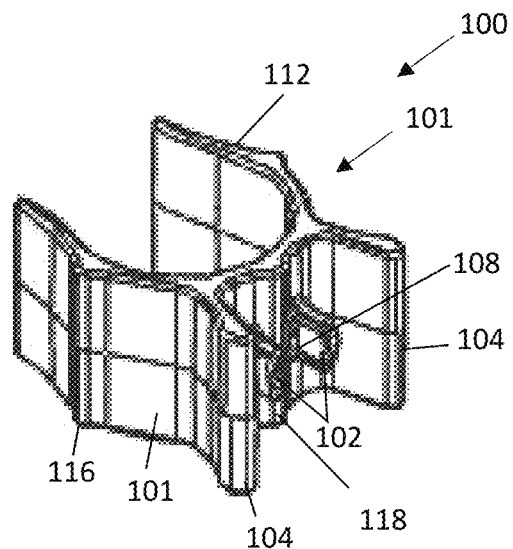
FIG. 5 is a rear perspective view of a clip insert, constructed according to the present invention.
Figure 6:
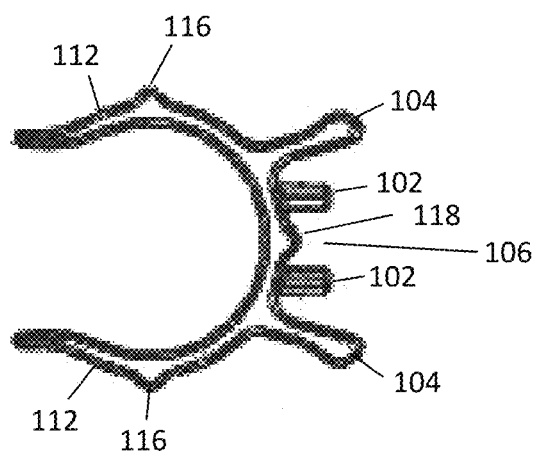
FIG. 6 is a side view of the clip insert, constructed according to the present invention.
Figure 7:
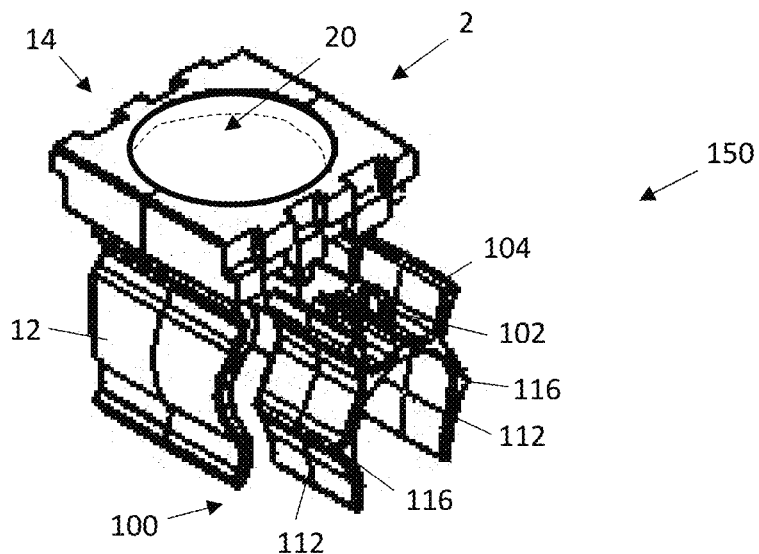
FIG. 7 is a front perspective view of the clip insert being inserted into the main clip to form the improved magnetic tool holding system, constructed according to the present invention.

In order to address the shortcomings of the prior, known tool holding systems, reference is made now to FIGS. 1-8, where there is illustrated a new and improved magnetic tool holder 150 (FIG. 7). Broadly, an embodiment of the present invention provides a retaining system embodying an improved method and apparatus for adjustably retaining hand tools in any position on a ferromagnetic surface, such as on the exterior of heavy equipment or in a truck bed. The improved retaining system may embody an elongated channel member and a tool retainer. The tool retainer may include a pair of clip flanges extending generally perpendicular from a base. In order to secure tools having smaller diameter handles, an insert is located within the tool retainer and adjacent to the pair of clip flanges 12 for securing the handles of the hand tools within a smaller diameter receptive pocket. The base may provide a magnet for removably attaching to the ferromagnetic surface. Moreover, the base may provide interlocking projections along its periphery so that two or more tool retainers may be interlocked together when stacked one on top of another. Alternatively, the tool holders may be slidably secured within the channel member, when nearby attachment surfaces are made of non-ferromagnetic material.

As will be explained hereinafter in greater detail, the improved magnetic tool holder 150 (FIG. 7) can be used on a conventional hand tool 24 (FIG. 10) in order to securely retain hand tool 24 and implements having handles, such as shovels, rakes, and the like. Also, the new and improved magnetic tool holder 150 can be utilized on hand tools 24 having different handle diameter sizes.

Referring now to FIGS. 1-4, there is illustrated tool retainer clip 2. Tool retainer clip 2 includes, in part, extension 10, a pair of clip flanges 12 extending generally perpendicular from a base 14. The extension may or may not have a widened area 11 near its center. The base 14 may form a generally rectangular cuboid having a mounting face 40 opposing a flange face 42, both of which are defined by a pair of opposing vertical walls 44 and a pair of opposing horizontal walls 46 along a periphery of the base 14.

A plurality of spaced-apart projections 16 may be formed along each horizontal wall 46, wherein the pattern of spaced-apart projections 16 on one horizontal wall 46 may be the mirror image of the pattern of spaced-apart projections 16 on the opposing horizontal wall 46, whereby two tool retainer clips 2, similarly oriented, with one horizontal wall 46 stacked on the other's (opposing) horizontal wall 46, would interlock their mirror-image patterns of spaced-apart projections 16. Such interlocking mating removably secures the two tool retainer clips 2 together so that they work in tandem about the same tool handle 24.

In certain embodiments, at least one projection 16 forms a female notch 36, while another at least one projection 16 forms a male bump 34 on the same horizontal wall 46, wherein projections 16 on the opposing horizontal wall 46 form a complementary male bump 34 and female notch 36 adapted and dimensioned to releasably mate with the opposing male bump 34 and female notch 36 during stacked interlocking.

It is to be understood that elements 10, 12, 14, 16, 40, 42, 44 and 46 of tool retainer clip 2 can be constructed of any suitable, durable high strength, UV resistant, rust resistant material. Alternatively, it should also be a water-resistant, flexible material.

Figure 3:
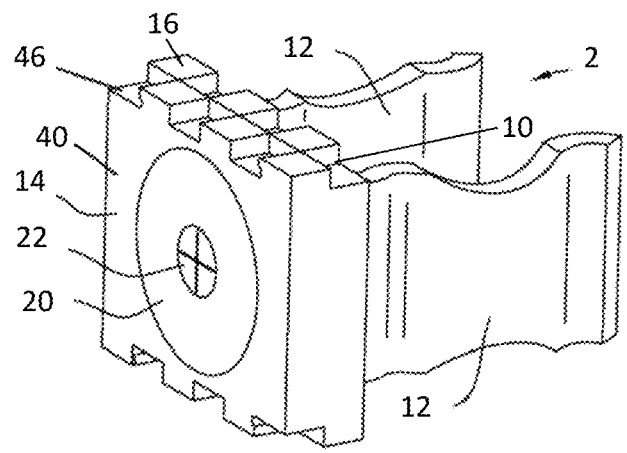
FIG. 3 is a rear perspective view of the main clip, constructed according to the present invention.
Figure 4:
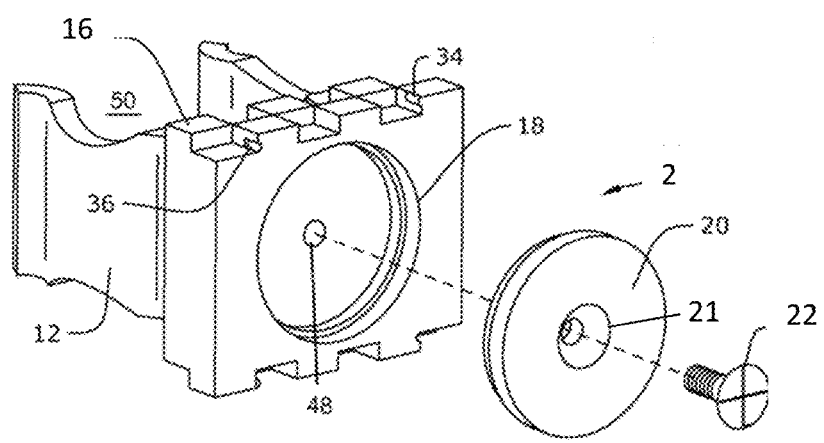
FIG. 4 is an exploded view of the main clip with the magnet being attached, constructed according to the present invention.

With respect to FIGS. 3 and 4, the mounting face 40 may include a magnet cavity 18, generally centrally disposed therein, as illustrated in FIG. 4. Recessed within the magnet cavity 18 is a fastener hole 48. The tool retainer clip 2 may include a magnet 20 secured within the magnet cavity 18. The magnet 20 may be secured thereto by a fastener 22 connected through a magnet hole 21 and into the fastener hole 48. It is to be understood that the magnetic strength of magnet 20 should be such that it will provide a great enough magnetic strength to cause the improved magnetic tool holder 150 to be securely retained on the metallic surface upon which the improved magnetic tool holder 150 is attached.

Each clip flange 12 may form a complementary arcuate portion as each extends from the flange face 42 so that they define a generally circular reception pocket 50. The pair of clip flanges 12 and clip insert 100 (FIG. 5) may terminate so as to define a slide-in void 52 (FIG. 13) in communication with the reception pocket 50. The reception pocket 50 may be adapted and dimensioned so that the clip insert 100 (FIG. 5) can be located within reception pocket 50 and removably secured by clip flanges 12. As will be discussed in greater detail later, the pair of clip flanges 12 (and the clip insert 100, if used) expand in an open configuration to removably receive the tool handles 24 and then retract to their original configuration, removably securing the tool handles 24 within the reception pocket 50.

With respect to FIGS. 5 and 6, there is illustrated clip insert 100. As shown in FIGS. 5 and 6, the clip insert 100 includes, in part, a clip insert frame 101, a pair of retention protrusions 102, a pair of alignment extensions 104, and a pair of clip flanges 112 extending generally perpendicular from the frame 101. The adjacent ends of the retention protrusions 102 have a spacing 106 between them. There is a recess 108 formed between the center of the curved retention protrusions 102.

Located along the clip flanges 112 are alignment protrusions 116. Finally, located on clip insert frame 101 and between the pair of retention protrusions 102 is alignment protrusion 118. It is to be understood that the clip insert 100, preferably, can be constructed of any suitable, durable high strength, UV resistant, rust resistant material.

As will be discussed in greater detail later, a unique aspect of the present invention is the use of the pair of retention protrusions 102, the pair of alignment extensions 104, alignment protrusions 116, and alignment protrusion 118. The pair of retention protrusions 102, the pair of alignment extensions 104, alignment protrusions 116, and alignment protrusion 118 allow clip insert 100 to be inserted within reception pocket 50 of tool retainer clip 2 and removably retained in reception pocket 50 of tool retainer clip 2.

Figure 8:
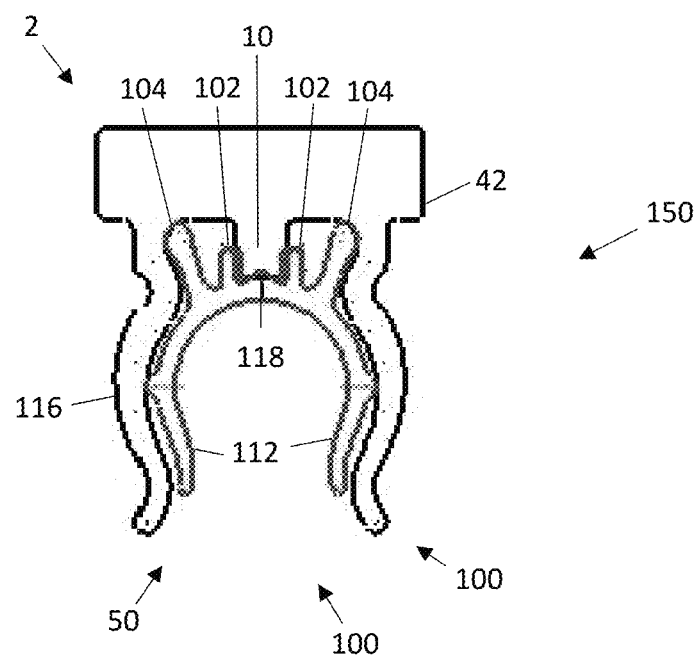
FIG. 8 is a side view of the clip insert being inserted into the main clip to form the improved magnetic tool holding system, constructed according to the present invention.

As shown in FIGS. 7 and 8, in order to construct magnetic tool holder 150, clip insert 100 is located within reception pocket 50 of tool retainer clip 2. Furthermore, the pair of retention protrusions 102 are used to position and hold clip insert 100 onto extension 10 of tool retainer clip 2. Also, the pair of alignment extensions 104 are used to align clip insert 100 with the areas where the upper end of flanges 12 and flange face 42 of tool retainer clip 2 intersect. Finally, alignment protrusions 116 are used to align clip insert 100 with flanges 12 of tool retainer clip 2. Another unique aspect of the present invention is that the pair of retention protrusions 102, the pair of alignment extensions 104, alignment protrusions 116, and alignment protrusion 118 of clip insert 100 can be used in conjunction with extension 10, flanges 12, and flange face 42 of tool retainer clip 2 to removably retain clip insert 100 within reception pocket 50 of tool retainer clip 2. In this manner, if the end user needs to retain a tool that has a smaller tool handle diameter than reception pocket 50, then the end user simply has to insert clip insert 100 into reception pocket 50 of tool retainer clip 2 in order to provide a smaller diameter reception pocket 200 that is capable of adequately retaining the tool within reception pocket 200, as will be described in greater detail later.

Figure 12:
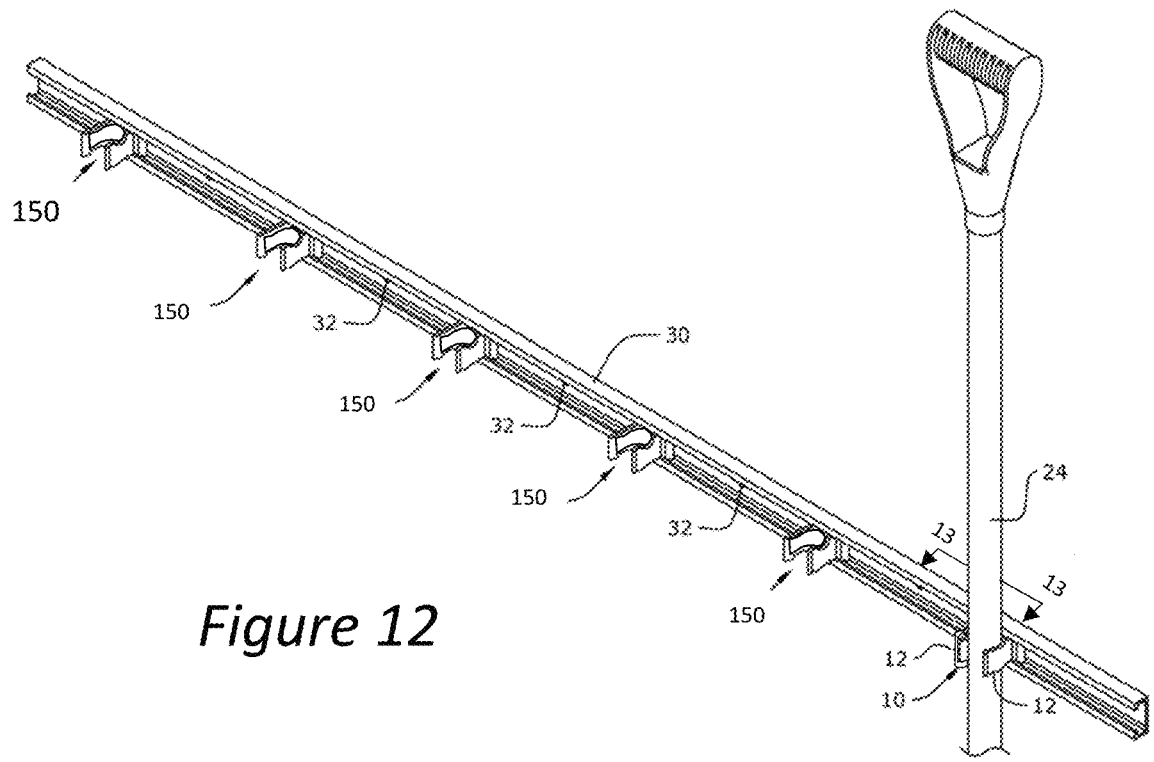
FIG. 12 is a perspective view of an exemplary embodiment of the present invention which illustrates a plurality of improved magnetic tool holders with a hand tool attached to one of the improved magnetic tool holders.
Figure 13:
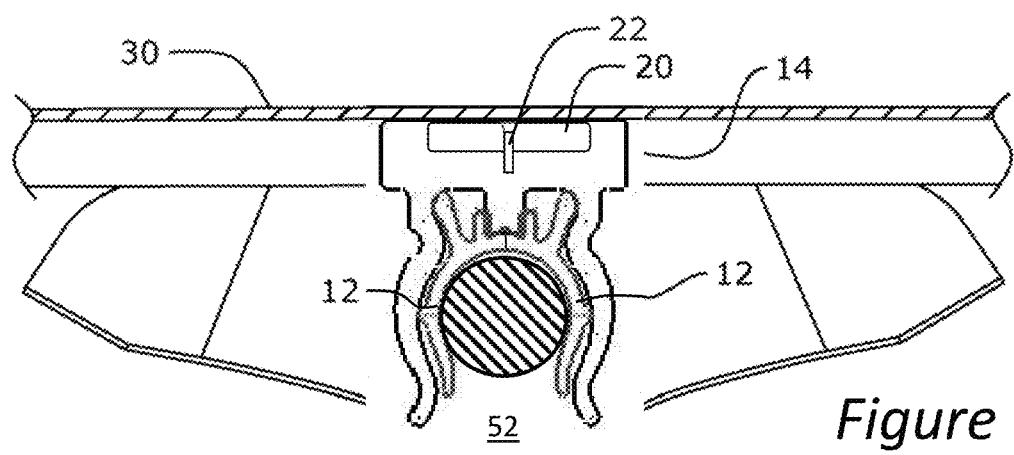
FIG. 13 is a section detail view of an exemplary embodiment of the present invention which illustrates a plurality of improved magnetic tool holders with a hand tool attached to one of the improved magnetic tool holders, taken along line 13-13 in FIG. 12.

With respect to FIGS. 12 and 13, the retaining system may include the elongated channel member 30. The channel member 30 may be generally C-shaped so as to form a track dimensioned and adapted to slidably receive a plurality of magnetic tool holders 150, operably engaging the opposing horizontal walls 46. Along a portion of the channel member 30, a plurality of track mounting holes 32 may be conventionally formed for conventionally securing the channel member 30 to an attachment surface such as a garage wall by using conventional mechanical fasteners.

The tool holders 150 are shown here inside the channel member 30 in an orientation to hold handles 24 in a vertical direction. Since the base of the tool holders is square, it is designed to also fit into the channel member 30 rotated 90 degrees, such that it holds the handle 24 in a horizontal direction. If several tool holders are rotated in this direction, these can all hold the same handle. This would be useful when the tool is desired to be held horizontally, or for the case in which the tool is very heavy and requires several tool holders 150.

Please note that the embodiment of FIGS. 12 and 13 can use tool holders which employ magnets (20 of FIG. 7) and channel member 30 can be a ferromagnetic material to add to the force holding the tool.

FIGS. 12 and 13 may also function without magnets, and simply be held within channel member 30.

With respect to FIGS. 1-13, a method of using the present invention may include the following: if the end user needs to hold a tool that has a tool handle that is smaller in diameter than reception pocket 50 of tool retainer clip 2, then the end user can insert a clip insert 100 into reception pocket 50. It is to be understood that if the tool handle diameter is at least as large as the diameter of reception pocket 50, then the end user will probably not have to use clip insert 100. Once the end user has determined if a clip insert 100 is needed (and, if so, has inserted it), the end user may then mount the mounting face 40 of the tool retainer clip 2 to a ferromagnetic attachment surface 28 via the magnet 20 so that the pair of clip flanges 12 (and flanges 112 of clip insert 100 if clip insert 100 is inserted into tool retainer clip 2) extend therefrom. Then the user may removably secure the handle 24 of a hand tool within the receptive pocket 200 to store and/or organize at least one hand tool within the accompanying space.

Figure 9:
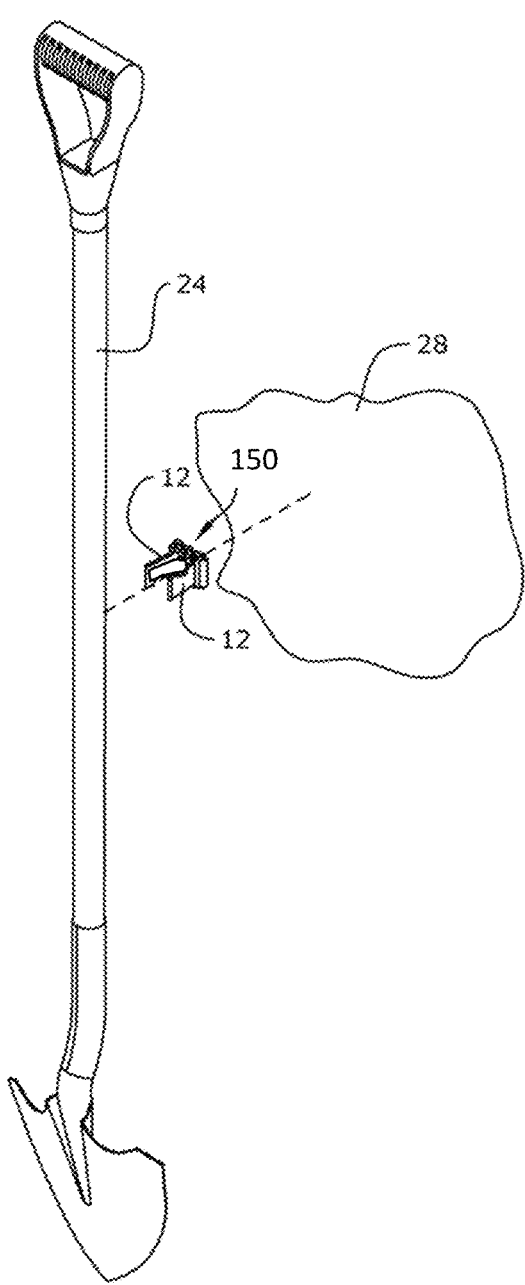
FIG. 9 is an exploded view of an exemplary embodiment of the present invention illustrating a hand tool prior to being attached to the improved magnetic tool holding system.
Figure 10:
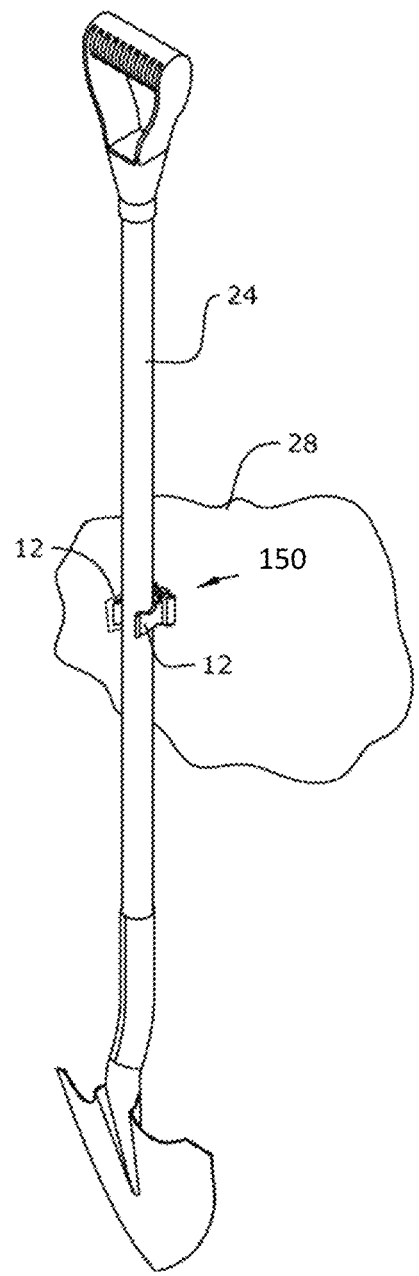
FIG. 10 is a perspective view of an exemplary embodiment of the present invention with a hand tool attached to the improved magnetic tool holding system.
Figure 11:
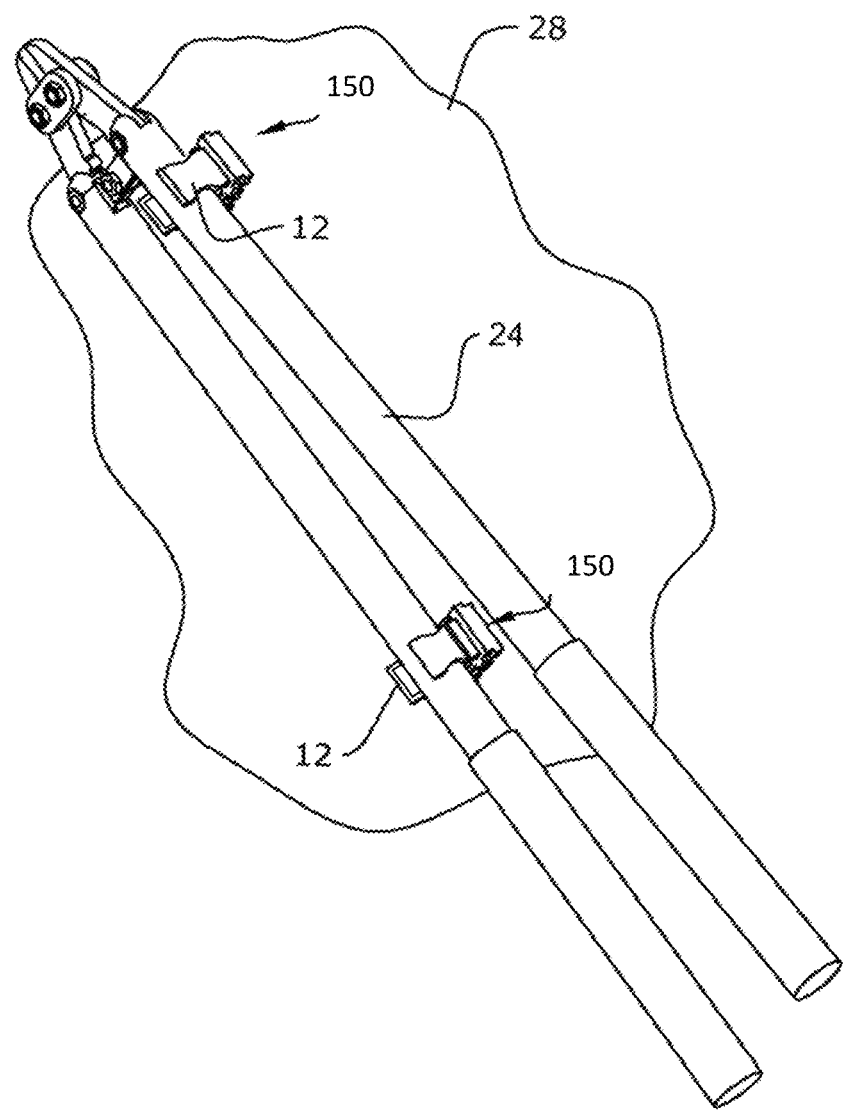
FIG. 11 is a perspective view of an exemplary embodiment of the present invention with another hand tool attached to the improved magnetic tool holding system.

By attaching the magnetic tool holder 150 to a shovel handle, rake, hoe or any handled tool in two places, the user can then place the tool 24 on the inside lateral side of a pickup bed. The tool 24 is now off the bed floor thereby allowing room for cargo and easy access from the rear or side of the truck (FIGS. 9 and 10). Furthermore, attaching the magnetic tool holder 150 to a snow shovel or ice scraper carried in the trunk of a car allows the tool to be attached to the roof of the trunk thereby leaving more room for other items. Finally, by attaching two or more magnetic tool holders 150 to a hand tool 24 with two handles, magnetic tool holders 150 enable the hand tool 24 to be removably connected to any ferromagnetic attachment surface 28 at each handle, so both are secured, as illustrated in FIG. 11.

It is to be understood that in certain embodiments, the mounting face 40 may not house the magnet 20, but rather the user may secure the mounting face 40 to a non-ferromagnetic attachment surface by attaching the fastener 22 through the fastener hole 48. It is to be further understood that the user may fasten the channel member 30 to the non-ferromagnetic attachment surface through its track mounting holes 32, and slidably populate the track with the desired number of tool holders 150.

Figure 1:
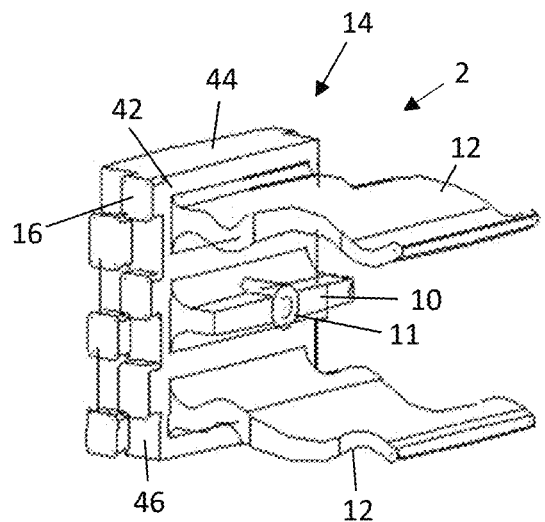
FIG. 1 is a front perspective view of a main clip, constructed according to the present invention.
Figure 2:
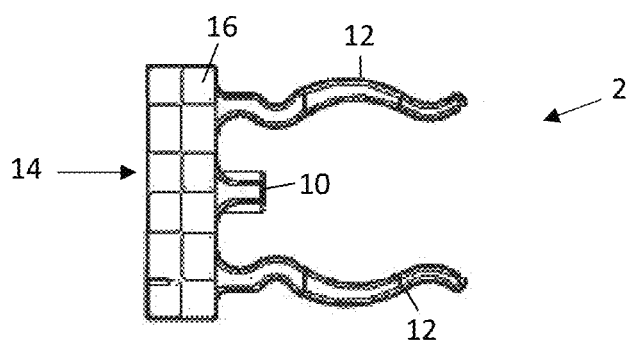
FIG. 2 is a side view of the main clip, constructed according to the present invention.
Figure 14:
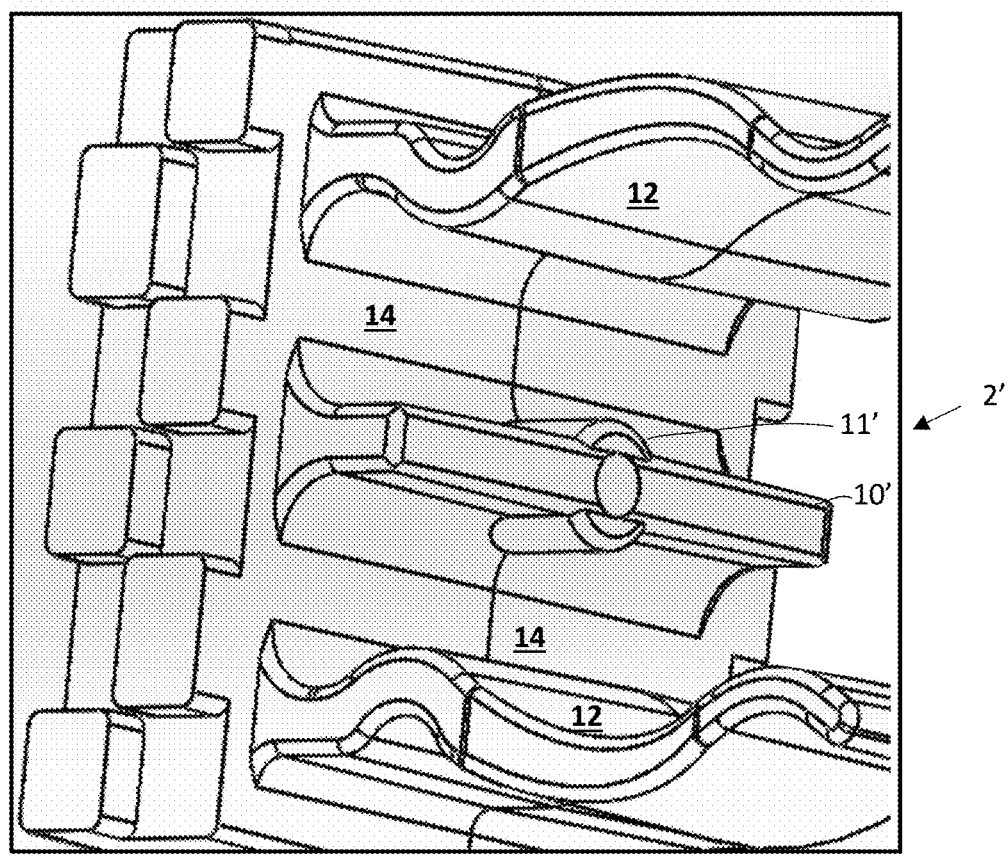
FIG. 14 is a front perspective view of a main clip, constructed according to a second embodiment of the present invention.
Figure 15:
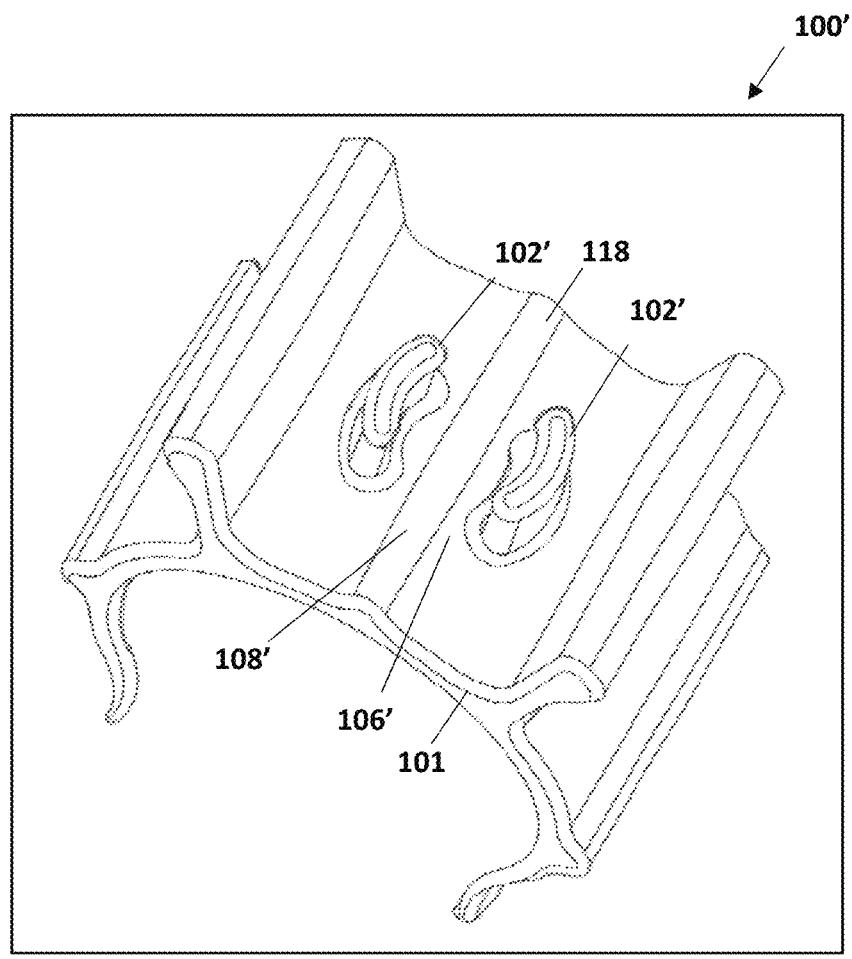
FIG. 15 is a rear perspective view of a clip insert, constructed according to a second embodiment of the present invention.

Another embodiment of the current invention is shown in FIGS. 14 and 15. As is true with all the reference numbers in the Figures, parts with like reference numbers have like structures. In FIG. 14, an inside surface of a modified tool retainer clip 2' is shown. (Reference numbers followed by a single quote are related to, but modified, versions of the structures indicated by the same reference number without the single quote.) In this embodiment extension 10' is similar to extension 10 in that they both extend outward from base 14, as shown in FIGS. 1, 2 and 8. However, extension 10' has a widened area 11' near its central point sized and shaped to snugly fit in the spacing 106' between snap-on clip 102' shown on modified clip insert 100' of FIG. 15.

The snap-on clip 102' consist of rounded walls extending generally perpendicular from the clip insert frame 101. When clip insert 100' is fit into 2', extension 10' slides through spacing 106' between snap-on clip 102' until widened area 11' meets snap-on clip 102'. At this point, more force is required to force widened area 11' to snap into the recess 108' between the alignment extensions 102'. The clip insert 100' is then secured at the center of tool clip retainer 2, and not allowed to slide any further in either direction.

Similarly, by applying the proper amount of force, widened area 11' may be forced out (snapped out) of recess 108' allowing the clip insert 100' to move relative to tool clip retainer 2'.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant reserves the right to physically incorporate into the written description or any other portion of the application, any and all such claims. Thus, for example, under no circumstances may the patent be interpreted as allegedly not providing a written description for a claim on the assertion that the precise wording of the claim is not set forth in the written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description herein is not intended to limit the invention, except as indicated in the appended claims.

Therefore, provided herein is a new and improved magnetic tool holding system. The preferred magnetic tool holding system, according to various embodiments of the present invention, offers the following advantages: ease of use; lightness in weight; durability; excellent tool retaining characteristics; and the ability to retain tools having different handle sizes. In fact, in many of the preferred embodiments, these advantages of ease of use, lightness in weight, durability, excellent tool retaining characteristics, and the ability to retain tools having different handle sizes are optimized to an extent that is considerably higher than heretofore achieved in prior, known tool holding systems.

I claim:

1. A magnetic tool holder, comprising:
   a tool retainer clip, wherein the tool retainer clip includes a base, a first side and a second side operatively connected to the base, a pair of clip flanges extending generally perpendicular from the first side, and a magnet located within a portion of the second side; and
   a clip insert, wherein the clip insert includes a clip insert frame, a pair of alignment extensions located on the clip insert frame, a pair of retention protrusions located on the clip insert frame and located adjacent to the pair of alignment extensions, and a pair of clip insert flanges operatively connected to the clip insert frame and located adjacent to the pair of alignment extensions.

2. The magnetic tool holder, as in claim 1, wherein the tool retainer clip is further comprised of:
   a tool retainer clip extension operatively connected to the first side and located between the pair of clip flanges.

3. The magnetic tool holder, as in claim 1, wherein the clip insert is further comprised of:
   first and second alignment protrusions operatively connected to the clip insert frame such that the first alignment protrusion is located along a portion of one of the pair of clip insert flanges and the second alignment protrusion is located along a portion of the other of the pair of clip insert flanges.

4. The magnetic tool holder, as in claim 1, wherein the clip insert is further comprised of:
   a third alignment protrusion operatively connected to the clip insert frame, wherein the third alignment protrusion is located between the pair of retention protrusions.

5. The magnetic tool holder, as in claim 1, wherein the base is further comprised of:
   a magnet cavity located within a portion of the second side such that the magnet cavity is adapted and dimensioned to removably receive the magnet.

6. The magnetic tool holder, as in claim 5, wherein the base is further comprised of:
   a fastener hole located within the magnet cavity.

7. The magnetic tool holder, as in claim 1, wherein the base is further comprised of:
   a peripheral sidewall connected between the second side and the first side, wherein a first plurality of projections is located along a first portion of the peripheral sidewall and wherein a second plurality of projections is located on an opposing second portion of the peripheral sidewall.

8. The magnetic tool holder, as in claim 7, wherein the base is further comprised of:
   a first female notch and a first male bump located on the first plurality of projections; and
   a second female notch and a second male bump located on the second plurality of projections.

9. The magnetic tool holder, as in claim 1, wherein the magnetic tool holder further comprises:
   a receptive pocket located adjacent to the pair of clip flanges and the pair of clip insert flanges.

10. A magnetic tool holder, comprising:
    a tool retainer clip, wherein the tool retainer clip includes a base, a first side and a second side operatively connected to the base, a pair of clip flanges extending generally perpendicular from the first side, and a magnet located within a portion of the second side;
    a magnet cavity located within a portion of the second side such that the magnet cavity is adapted and dimensioned to removably receive the magnet; and
    a clip insert, wherein the clip insert includes a clip insert frame, a pair of alignment extensions located on the clip insert frame, a pair of rounded retention snap-on clips located on the clip insert frame and located adjacent to the pair of alignment extensions, and a pair of clip insert flanges operatively connected to the clip insert frame and located adjacent to the pair of alignment extensions.

11. The magnetic tool holder, as in claim 10, wherein the tool retainer clip is further comprised of:
    a tool retainer clip extension operatively connected to the first side and located between the pair of clip flanges, wherein a widened area is located along a portion of the tool retainer clip extension.

12. The magnetic tool holder, as in claim 10, wherein the clip insert is further comprised of:
    first and second alignment protrusions operatively connected to the clip insert frame such that the first alignment protrusion is located along a portion of one of the pair of clip insert flanges and the second alignment protrusion is located along a portion of the other of the pair of clip insert flanges.

13. The magnetic tool holder, as in claim 10, wherein the clip insert is further comprised of:
    a third alignment protrusion operatively connected to the clip insert frame and wherein the third alignment protrusion is located between the pair of rounded retention snap-on clips.

14. The magnetic tool holder, as in claim 10, wherein the base is further comprised of:
    a fastener hole located within the magnet cavity.

15. The magnetic tool holder, as in claim 10, wherein the base is further comprised of:
    a peripheral sidewall connected between the second side and the first side, wherein a first plurality of projections is located along a first portion of the peripheral sidewall and wherein a second plurality of projections is located on an opposing second portion of the peripheral sidewall.

16. The magnetic tool holder, as in claim 15, wherein the base is further comprised of:
   a first female notch and a first male bump located on the first plurality of projections; and
   a second female notch and a second male bump located on the second plurality of projections.

17. The magnetic tool holder, as in claim 10, wherein the magnetic tool holder further comprises:
   a receptive pocket located adjacent to the pair of clip flanges and the pair of clip insert flanges.

18. A method of retaining tools, wherein the method comprises the steps of:
   providing a magnetic tool holder comprising:
      a tool retainer clip, wherein the tool retainer clip includes a base, a first side and a second side operatively connected to the base, a pair of clip flanges extending generally perpendicular from the first side, and a magnet located within a portion of the second side; and
      a clip insert, wherein the clip insert includes a clip insert frame, a pair of alignment extensions located on the clip insert frame, a pair of retention protrusions located on the clip insert frame and located adjacent to the pair of alignment extensions, and a pair of clip insert flanges operatively connected to the clip insert frame and located adjacent to the pair of alignment extensions;
   forming a receptive pocket, wherein the receptive pocket is located adjacent to the pair of clip flanges and the pair of clip insert flanges;
   inserting a portion of a tool handle into the receptive pocket;
   securely retaining the tool handle by the magnetic tool holder; and
   magnetically attaching the magnetic tool holder to a ferromagnetic surface to removably retain the tool handle to the ferromagnetic surface.

19. The method of retaining tools, as in claim 18, wherein the step of providing a magnetic tool holder is further comprised of the step of:
   providing the clip insert with first and second alignment protrusions operatively connected to the clip insert frame such that the first alignment protrusion is located along a portion of one of the pair of clip insert flanges and the second alignment protrusion is located along a portion of the other of the pair of clip insert flanges.

20. The method of retaining tools, as in claim 18, wherein the step of providing a magnetic tool holder is further comprised of the step of:
   providing the clip insert with a third alignment protrusion operatively connected to the clip insert frame and wherein the third alignment protrusion is located between the pair of retention protrusions.

\* \* \* \* \*